US011174823B2

United States Patent
Bareis et al.

(10) Patent No.: US 11,174,823 B2
(45) Date of Patent: Nov. 16, 2021

(54) VALVE

(71) Applicant: BorgWarner Esslingen GmbH, Oberboihingen (DE)

(72) Inventors: Bernd Bareis, Taeferrot-Utzstetten (DE); Jochen Wentz, Esslingen (DE)

(73) Assignee: BorgWarner Esslingen GmbH, Ludwigsburg (DE)

( * ) Notice: Subject to any disclaimer, the term of this patent is extended or adjusted under 35 U.S.C. 154(b) by 213 days.

(21) Appl. No.: 15/146,758

(22) Filed: May 4, 2016

(65) Prior Publication Data
US 2016/0327182 A1    Nov. 10, 2016

(30) Foreign Application Priority Data

May 7, 2015 (DE) .................. 10 2015 107 135.5
Jul. 15, 2015 (DE) .................. 10 2015 111 460.7

(51) Int. Cl.
*F02M 26/60* (2016.01)
*F16K 41/08* (2006.01)
(Continued)

(52) U.S. Cl.
CPC ............ *F02M 26/66* (2016.02); *F02M 26/67* (2016.02); *F16K 31/52408* (2013.01); *F16K 41/08* (2013.01); *F02M 26/54* (2016.02)

(58) Field of Classification Search
CPC ........... F16K 41/00; F16K 1/12; F02M 26/66; F02M 26/67; F02M 26/54
(Continued)

(56) References Cited

U.S. PATENT DOCUMENTS 5,238,252 A * 8/1993 Stewen ................. F16K 41/02
251/214
5,713,315 A * 2/1998 Jyoutaki ................ F01L 9/02
123/568.26
(Continued)

FOREIGN PATENT DOCUMENTS

DE          197 55 238 A1    6/1999
DE    10 2010 048 865 A1    4/2012
(Continued)

OTHER PUBLICATIONS

National Bronze Michigan, Aluminum Bronze, 2012 https://web.archive.org/web/20130814182914/http://www.nationalbronze.com/aluminum-bronze.php.*

*Primary Examiner* — Kelsey E Cary
(74) *Attorney, Agent, or Firm* — Hackler Daghighian Martino & Novak

(57) ABSTRACT

A hot gas exhaust recirculation valve includes a housing containing a duct for conducting gases, a drive chamber, and a valve stem which is mounted in the housing. The valve stem can be displaced in its longitudinal direction thereof and extends from the drive chamber into the duct. The end of the valve stem that is situated in the drive chamber is coupleable to a drive device. A closing body is fastened to the other end of the valve stem. The closing body is situated in the duct and has a closed position in which it separates an upstream section of the duct from a downstream section of the duct. A sealing ring surrounds the valve stem and is arranged between the duct and the drive chamber. The valve stem is supported within two bearing bushings that are spaced apart from each other, between which the sealing ring is arranged.

18 Claims, 2 Drawing Sheets

(51) Int. Cl.
    *F02M 26/66*     (2016.01)
    *F02M 26/67*     (2016.01)
    *F16K 31/524*     (2006.01)
    *F02M 26/54*     (2016.01)

(58) Field of Classification Search
    USPC .......................................................... 251/330
    See application file for complete search history.

(56) References Cited

U.S. PATENT DOCUMENTS

| | | | |
|---|---|---|---|
| 6,640,834 B1 * | 11/2003 | Hamkins | F01L 1/022 |
| | | | 123/90.12 |
| 8,955,825 B2 * | 2/2015 | Kung | F16K 31/508 |
| | | | 251/214 |
| 2007/0240690 A1 * | 10/2007 | Nanba | F16K 31/041 |
| | | | 123/568.18 |
| 2012/0193562 A1 | 8/2012 | Takai et al. | |
| 2012/0325183 A1 * | 12/2012 | Hatano | F16K 41/04 |
| | | | 123/568.11 |
| 2014/0261772 A1 * | 9/2014 | Kung | F16K 31/508 |
| | | | 137/377 |
| 2014/0311464 A1 * | 10/2014 | Sano | F02M 26/53 |
| | | | 123/568.11 |

FOREIGN PATENT DOCUMENTS

| | | |
|---|---|---|
| DE | 11 2010 005 282 T5 | 2/2013 |
| DE | 10 2013 114 058 A1 | 6/2015 |
| EP | 0 856 657 A2 | 8/1998 |

* cited by examiner

PRIOR ART

VALVE

CROSS-REFERENCE TO RELATED APPLICATIONS

This application claims priority to the German application numbers DE 10 2015 107 135.5 filed on May 7, 2015 and DE 10 2015 111 460.7 filed on Jul. 15, 2015, the contents of which are fully incorporated herein with these references.

DESCRIPTION

Field of the Invention

The invention proceeds from a valve, in particular a hot gas valve, having a housing containing a duct for conducting gases; a drive chamber, which does not conduct gases; and a valve stem, which is mounted in the housing such that said valve stem can be displaced in the longitudinal direction thereof and which extends from the drive chamber into the duct, the end of said valve stem that is situated in the drive chamber being coupleable to a drive device, and a closing body being fastened to the other end of said valve stem, said closing body being situated in the duct and having a closed position, in which it separates an upstream section of the duct from a downstream section of the duct, wherein a sealing ring that surrounds the valve stem is arranged between the duct and the drive chamber.

Background of the Invention

A valve of the type mentioned above is disclosed in EP 0 856 657 A2 and in the subsequently published document DE 10 2013 114 058 A1. In the known valves, a valve stem is mounted in the housing such that said valve stem can be displaced in the longitudinal direction thereof. For mounting, a long, continuous bearing bushing is provided, in which the valve stem is supported in a sliding manner. Owing to the loading on the bearing bushing from hot gases, in particular exhaust gases of an internal combustion engine, the bearing bushing is exposed to intense strain as a result of high temperatures, contamination, in particular soot, and corrosive attack from aggressive constituents of the exhaust gas. In modern exhaust gas recirculation valves, in particular in those that are suitable for internal combustion engines and comply with the "Euro 6" European emission standard, valve stem and bearing bushing are produced from high-grade stainless steel. This means that corrosion problems do not occur in the bearing. The sliding movement between valve stem and bearing bushing when the valve opens and closes results in relatively high wear on the bearing bushing, in particular if the drive device provided to displace the valve stem exerts a force component on the valve stem in the radial direction of the valve stem in addition to the actuating force effective in the longitudinal direction.

It may be an object of the present invention to improve a valve of the type mentioned in the introduction and to increase its service life.

The object is achieved by a valve having the features of the independent claims. Advantageous developments form the subject matter of the dependent claims.

SUMMARY OF THE INVENTION

The valve according to the invention, in particular a poppet valve, can in particular be used in an exhaust gas recirculation system in an exhaust system of an internal combustion engine and in this case is also referred to as an exhaust gas recirculation valve. Said valve can be used in the high-pressure exhaust system of Euro 6 motor vehicle engines, in which the exhaust gases have high temperatures of over 700° C. The valve contains a housing having a duct to conduct gases and a drive chamber, which does not conduct gas and in which a drive device can be arranged to open and close the valve. The valve contains a valve stem, which is mounted in the housing such that said valve stem can be displaced in the longitudinal direction thereof and extends from the drive chamber into the duct. The valve stem is movable in a translational manner by means of the drive device. A closing body is fastened to the end of the valve stem that projects into the duct, which closing body is situated in the duct, can interact with a valve seat arranged in the housing, and has a closed position, in which it separates an upstream section of the duct from a downstream section of the duct. The end of the valve stem that is situated in the drive chamber can be coupled to a drive device. A sealing ring that surrounds the valve stem is arranged between the duct and the drive chamber. The sealing ring can in particular be in the form of a shaft seal. The valve stem is supported in two bearing bushings that are spaced apart from each other, between which the sealing ring is arranged. The valve stem can have at least one circular-cylindrical section, on which the bearing bushings are arranged.

The invention may have (but which are not necessary) substantial advantages:
  The invention makes it possible for the effective bearing length in the interior of the valve to be increased without changing the outer dimensions of the valve.
  The increased effective bearing length results in less wear and a longer operational capability of the valve.
  This is advantageous in particular in the case of exhaust gas recirculation valves, since the installation space available for each component is limited in modern motor vehicles and an increase in the outer dimensions of the valve is not acceptable.
  The bearing bushing that is further away from the duct is protected and shielded very well from the gases flowing in the duct by the sealing ring arranged between said bearing bushing and the duct, so said bearing bushing is not loaded by hot and corrosive gases.
  The bearing bushing that is further away from the duct can be lubricated with a grease, in particular a PTFE-containing grease, in particular if said bearing bushing consists of high-grade steel. The sealing ring arranged between said bearing bushing and the duct prevents grease passing into the bearing bushing that is situated closer to the duct, where grease can be disadvantageous, since it can result in increased adhesion of dirt particles there.
  The advantages mentioned are particularly significant if the drive device causes a force component effective radially on the valve stem in addition to the actuating force effective in the longitudinal direction of the valve stem, for example if the valve stem is driven by means of a cam disc or slotted guide. A radial force component mainly loads to a great extent the bearing bushing further away from the duct, which bearing bushing is arranged closer to the effective point of the radial force owing to the invention. This results in lower loading of said bearing bushing. At the same time, the greater effective bearing length also relieves the load on the bearing bushing closer to the duct.

In one configuration of the invention, the valve stem can be supported by two separate bearing bushings that consist of different materials. The different materials of the two bearing bushings mean that the most appropriate material can be chosen separately for each of the bearing bushings, so that wear is reduced and the service life of the valve is increased. The bearing bushing closer to the duct can consist of corrosion-resistant high-grade steel, in particular heat-resistant high-grade stainless steel, for example a high-grade steel of material number 1.4305. The valve stem can likewise consist of corrosion-resistant high-grade steel. The bearing bushing further away from the duct can consist of non-ferrous metal, in particular a copper-based alloy. For example, a copper-zinc alloy (brass) or a copper-tin alloy (bronze) is suitable. According to previous opinion, high-grade steel must be used as the bearing material to mount the valve stem in hot gas valves, so that the bearing withstands the exacting demands resulting from high temperatures and aggressive substances in exhaust gases of an internal combustion engine being over 700° C. hot. Surprisingly, it has now been found that dividing a long bearing bushing into two separate bearing bushings, of which the bearing bushing closer to the duct still consists of a high-grade steel, makes it possible for a non-ferrous metal to be used for the bearing bushing further away from the duct, which non-ferrous metal represents a favorable material partner for the sliding bearing of the high-grade steel valve stem.

In a further configuration, a free annular space that surrounds the valve stem can be arranged between the bearing bushing closer to the duct and the sealing ring. The free annular space can act as a dirt-collecting space for particles that enter the bearing bushing closer to the duct, so that the dirt cannot cause the valve stem to jam in the bearing bushing. A protective sleeve can adjoin the bearing bushing closer to the duct, which protective sleeve extends from said bearing bushing in the direction of the closing body and surrounds the valve stem at a distance. The protective sleeve reduces the temperature load on the valve stem and protects the bearing bushing closer to the duct from excessive contamination. The protective sleeve can be integral with the bearing bushing closer to the duct or be in the form of a separate part. A protective sleeve formed separately from the bearing bushing can for example be pressed directly into the housing.

The outer diameter of the sealing ring can correspond at least to the outer diameter of one of the two bearing bushings, in particular also to the outer diameter of both bearing bushings. The sealing ring and the at least one bearing bushing with the same outer diameter can be inserted into a common cylindrical bore in the housing, as a result of which production of the valve is simplified. The common cylindrical bore can also be in the form of a stepped bore, the diameter of the bearing bushing closer to the duct being smaller, in particular by a few tenths of a millimeter, than the diameter of the sealing ring, and the latter in turn being smaller than the diameter of the bearing bushing further away from the duct. This can in particular make assembly easier. For a protective sleeve separate from the bearing bushing, a diameter can be provided that is smaller than the diameter of the bearing bushing closer to the duct.

The ratio of the effective bearing length, which is defined as the distance between the outer edges of the two bearing bushings, to the distance between a radial force exerted by the drive device and the bearing bushing further away from the duct can be between 1.2 and 1.8, in particular approximately 1.5, and is therefore substantially greater than the corresponding ratio in known valves. This can reduce tilting of the valve stem in the bearing bushings caused by the radial force and also wear of said bearing bushings.

BRIEF DESCRIPTION OF THE DRAWINGS

Further advantages and features of the invention can be found in the following description of an exemplary embodiment in conjunction with the figures, in which.

DETAILED DESCRIPTION OF THE PREFERRED EMBODIMENTS

Figure 1:
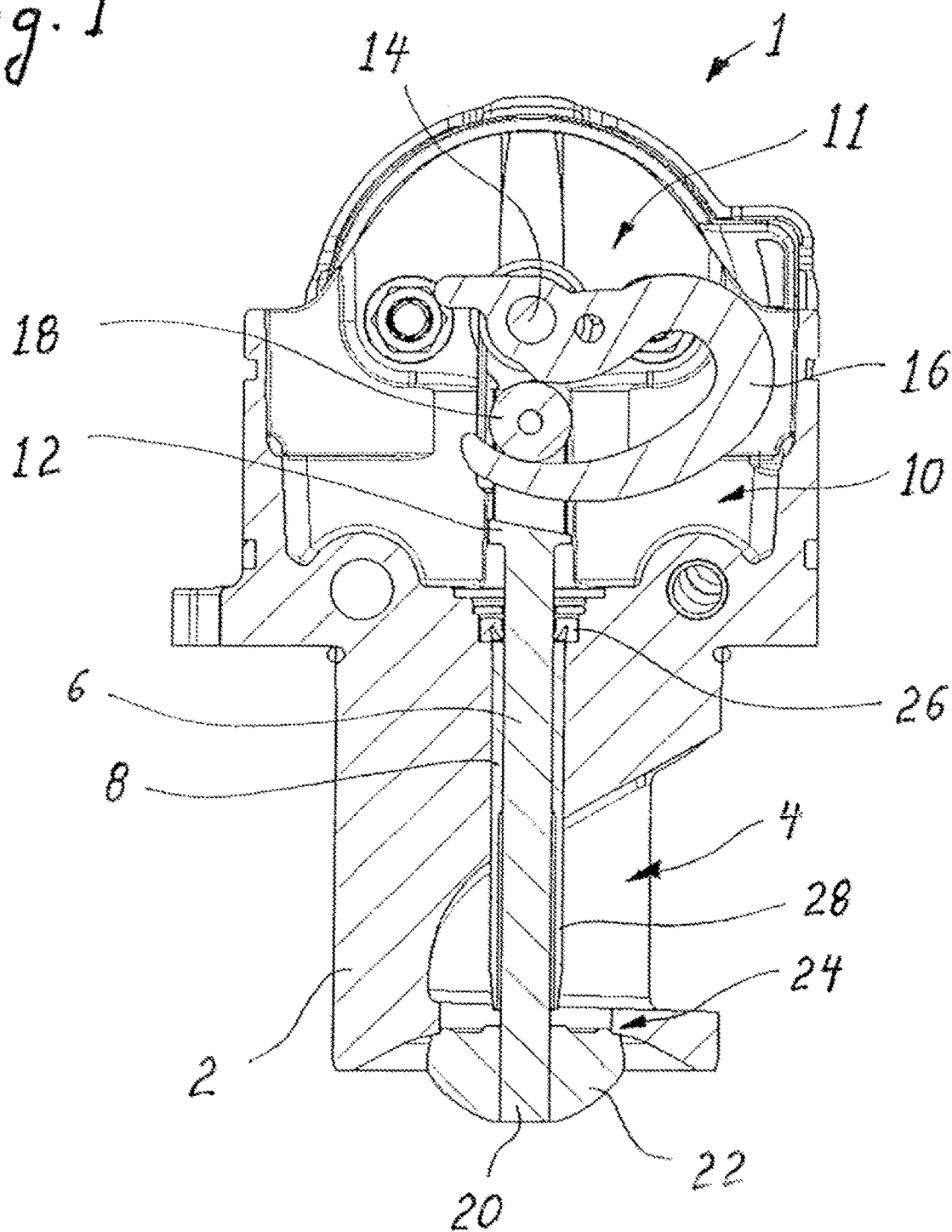
FIG. 1 shows a sectional view through a known valve, which is improved by the invention.

FIG. 1 shows a valve 1 with a housing 2, which valve is in the form of a hot gas exhaust recirculation valve and includes a duct 4 for conducting exhaust gases. The valve 1 contains a valve stem 6, which is mounted such that it can be displaced in the longitudinal direction thereof in a bearing bushing 8 situated in the housing 2. The valve 1 contains a drive chamber 10, which does not conduct gas and in which a drive device 11 is arranged. The valve stem 6 extends from the duct 4 into the drive chamber 10. The end 12 of the valve stem 6 that is situated in the drive chamber 10 is coupled to the drive device 11. The drive device 11 contains a shaft 14, which can be rotated by means of a rotary drive (not shown) and on which a cam disc 16 is attached in a non-rotatable manner. A roll 18 is attached to the end 12 of the valve stem 6, said roll being mounted in a freely rotatable manner and interacting with the cam disc 16.

A closing body 22 is fastened to the end 20 of the valve stem 6 situated in the duct 4, which closing body 22 interacts with a valve seat 24 formed on the housing 2 and has a closed position, in which it separates an upstream section of the duct 4 from a downstream section of the duct 4. FIG. 1 shows the closing body 22 in its closed position, in which it rests on the valve seat 24. In the view of FIG. 1, clockwise rotation of the shaft 14 displaces the valve stem 6 downwards by means of the cam disc 16 and the roll 18, so that the closing body 22 lifts off from the valve seat 24 and opens the passage in the duct 4.

The cam disc drive 11 of the valve stem 6 causes, in addition to the longitudinal force F1 effective in the longitudinal direction of the valve stem 6, a radial force F2 effective transversely thereto to be exerted on the end 12 of said valve stem 6, which radial force F2 is a high load for the bearing bushing 8.

A sealing ring 26 is arranged between the duct 4 and the drive chamber 10, which sealing ring 26 surrounds the valve stem 6 and prevents exhaust gases passing from the duct 4 into the drive chamber 10. A protective sleeve 28 adjoins the bearing bushing 8, which protective sleeve 28 extends from the bearing bushing 8 in the direction of the closing body 22 and surrounds the valve stem 6 at a distance. The protective sleeve 28 shields the valve stem 6 from the hot exhaust gases.

Figure 2:
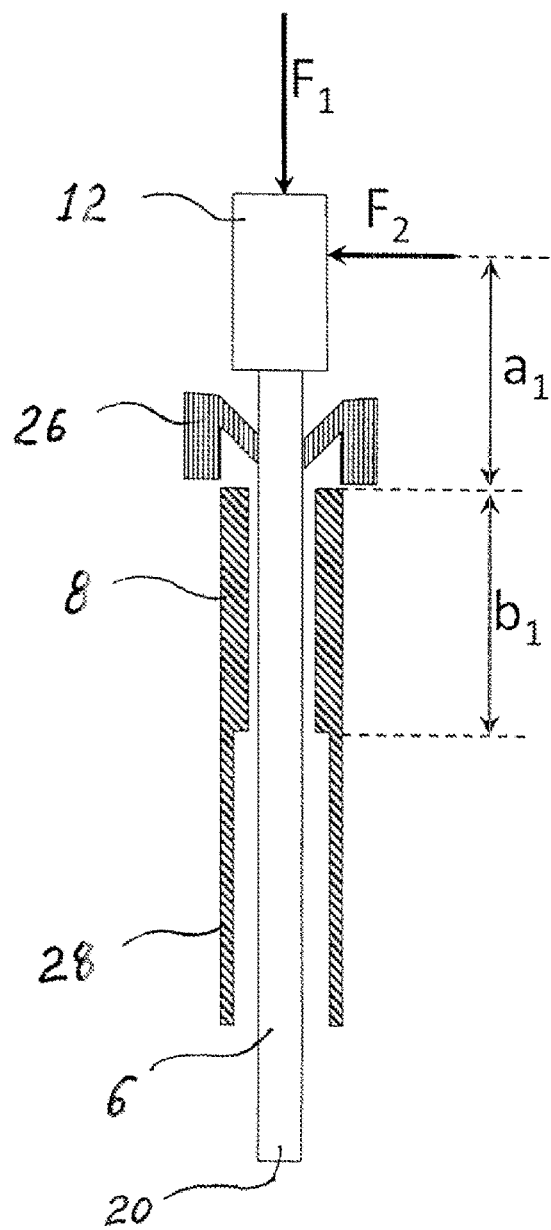
FIG. 2 shows a schematically simplified detail of the known valve of FIG. 1.

FIG. 2 shows the valve stem 6 of FIG. 1 and the region surrounding it again in a schematic manner, in which the same parts have been provided with the same reference symbols. The actuating force that acts on the end 12 of the valve stem 6 from the cam disc 16 in the longitudinal direction of said valve stem 6 in order to open the valve is labelled F1 in FIG. 2. In addition to the longitudinal force F1, the cam disc 16 causes a force component F2 that acts radially on the end 12. The radial force F2 has a distance a1 from the bearing bushing 8 and causes the valve stem 6 to tilt in the bearing bushing 8, so that the valve stem 6, which is shown concentric to the bearing bushing 8 in FIG. 2, only bears against the bearing bushing 8 at two points, namely top left and bottom right, during operation. The space conditions in modern motor vehicles are very limited, so the length b1 of the bearing bushing 8 cannot be increased. In the known valves, the distance a1 and the bearing length b1 can each be 25 mm. The ratio from b1 to a1 is typically approximately 1 or even less. This can result in rapid wear of the bearing bushing 8, so that the valve 1 needs to be replaced.

Figure 3:
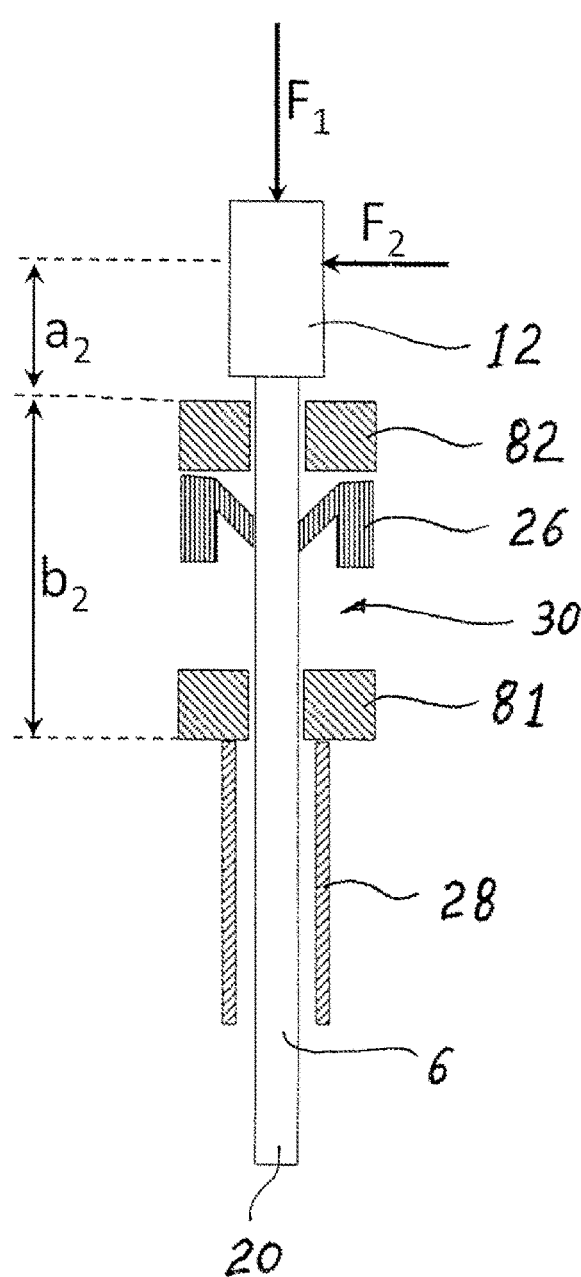
FIG. 3 shows a similarly schematic detail, corresponding to the detail of FIG. 2, of a valve improved according to the invention.

A valve 1 according to the invention is explained in more detail using the schematic diagram of FIG. 3, in which the same parts have again been provided with the same reference symbols. The rapidly wearing bearing bushing 8 is replaced by two separate bearing bushings 81 and 82. The bearing bushing 82 is protected very well from the hot and aggressive exhaust gases flowing in the duct 4 by the sealing ring 26 arranged there between. The housing 2 is not enlarged. The bearing bushing 81 is continued through the protective sleeve 28, which is formed separately from the bearing bushing 81 and sits in a press fit in the housing 2 in a manner that is not shown. The bearing bushing 81 closer to the duct 4 still consists of high-grade steel. The bearing bushing 82 further away from the duct 4 can consist of high-grade steel or brass and can be lubricated if necessary. Otherwise, the valve 1 according to the invention is configured in a corresponding manner to FIG. 1.

The invention allows the distance a2 of the radial force F2 from the bearing bushing 82 to be reduced, for example to approximately 20 mm. At the same time, the effective bearing length b2, which is defined as the distance between the outer edges of the two bearing bushings 81, 82, is increased, for example to approximately 30 mm. The total measure a2+b2 is unchanged and is equal to the total measure a1+b1. The ratio of b2 to a2 is between 1.2:1 and 1.8:1, in particular approximately 1.5:1, and is therefore substantially greater than the ratio of b1 to a1. The tilting of the valve stem 6 in the bearing bushings 81, 82 caused by the radial force F2 is reduced thereby. The valve stem 6 that is shown concentric to the bearing bushings 81, 82 in FIG. 2 thus bears against the bearing bushing 82 at the top left and against the bearing bushing 81 at the bottom right. The distance between these two contact points corresponds to the effective bearing length b2, which is greater than the bearing length b1. With bearing play unchanged, tilting of the valve stem 6 is therefore significantly reduced. A considerable reduction in the loading of the bearing bushings 81, 82 can be achieved without increasing the required installation space.

The outer diameter of the sealing ring 26 can correspond to the outer diameter of the two bearing bushings 81, 82, so that all three components can be mounted in a continuous cylindrical bore in the housing 2.

A free annular space 30 is formed between the bearing bushing 81 and the sealing ring 26, which free annular space surrounds the valve stem 6 and can collect dirt particles that enter the bearing gap between the valve stem 6 and the bearing bushing 81 and migrate in the direction towards the sealing ring 26, so jamming of the valve stem 6 is prevented.

LIST OF REFERENCE SYMBOLS

1 Valve
2 Housing
4 Duct
6 Valve stem
8 Bearing bushing
10 Drive chamber
11 Drive device
12 End of valve stem
14 Shaft
16 Cam disc
18 Roll
20 End of valve stem
22 Closing body
24 Valve seat
26 Sealing ring
28 Protective sleeve
30 Annular space
81 Bearing bushing
82 Bearing bushing
a1 Distance
a2 Distance
b1 Bearing length
b2 Bearing length
F1 Longitudinal force
F2 Radial force

What is claimed is:

1. A hot gas exhaust recirculation valve comprising:
   a housing containing a duct for conducting gases;
   a drive chamber, which does not conduct gases;
   a valve stem, which is mounted in the housing such that said valve stem can be displaced in a longitudinal direction thereof during valve-operation and which extends from the drive chamber into the duct, wherein a first end of said valve stem is situated in the drive chamber being coupleable to a drive device;
   a closing body fastened to a second end of said valve stem and situated in the duct, said closing body being movable by the valve stem along the longitudinal direction of the valve stem during valve-operation and having a closed position, in which the closing body separates an upstream section of the duct from a downstream section of the duct;
   wherein a sealing ring surrounds the valve stem and is arranged between the duct and the drive chamber;
   wherein the valve stem is supported within two bearing bushings that are spaced apart from each other, between which the sealing ring is arranged.

2. The hot gas exhaust recirculation valve according to claim 1, wherein the two bearing bushings consist of different materials.

3. The hot gas exhaust recirculation valve according to claim 2, wherein the bearing bushing closer to the duct consists of high-grade steel.

4. The hot gas exhaust recirculation valve according to claim 2, wherein the bearing bushing further away from the duct consists of non-ferrous metal.

5. The hot gas exhaust recirculation valve according to claim 1, wherein an outer diameter of the sealing ring corresponds to at least an outer diameter of one of the two bearing bushings.

6. The hot gas exhaust recirculation valve according to claim 1, wherein a free annular space surrounds the valve stem and is arranged between the bearing bushing closer to the duct and the sealing ring.

7. The hot gas exhaust recirculation valve according to claim 1, wherein the valve stem consists of high-grade steel.

8. The hot gas exhaust recirculation valve according to claim 1, wherein a protective sleeve adjoins the bearing bushing closer to the duct, wherein the protective sleeve extends from said bearing bushing in the direction of the closing body and surrounds the valve stem at a distance.

9. The hot gas exhaust recirculation valve according to claim 1, wherein a ratio of an effective bearing length, which is defined as a distance between outer edges of the two bearing bushings, and a distance of a radial force exerted by the drive device from the bearing bushing further away from the duct is between 1.2:1 and 1.8:1.

10. The hot gas exhaust recirculation valve according to claim 1, wherein the valve stem and the closing body move together in the longitudinal direction during valve-operation.

11. The hot gas exhaust recirculation valve according to claim 1, wherein the two bearing bushings are configured to arrange the valve stem allowing the valve stem to only be displaced in the longitudinal direction during valve-operation.

12. A hot gas exhaust recirculation valve comprising:
a housing containing a duct for conducting gases;
a drive chamber, which does not conduct gases;
a valve stem movably mounted in the housing displaceable during valve-operation in a longitudinal direction thereof, the valve stem extending from the drive chamber into the duct, wherein a first end of said valve stem is situated in the drive chamber and is coupleable to a drive device;
a closing body fastened to a second end of said valve stem and situated in the duct, said closing body being movable by the valve stem along the longitudinal direction of the valve stem during valve-operation and having a closed position in which the closing body separates an upstream section of the duct from a downstream section of the duct;
a sealing ring surrounding the valve stem, the sealing ring arranged between the duct and the drive chamber;
wherein the valve stem is supported within two bearing bushings that are spaced apart from each other, between which the sealing ring is arranged;
wherein the two bearing bushings consist of different materials where the bearing bushing closer to the duct consists of high-grade steel and the bearing bushing further away from the duct consists of non-ferrous metal.

13. The hot gas exhaust recirculation valve according to claim 12, including a free annular space surrounding the valve stem, where the free annular space is arranged between the bearing bushing closer to the duct and the sealing ring.

14. The hot gas exhaust recirculation valve according to claim 13, wherein the valve stem consists of high-grade steel.

15. The hot gas exhaust recirculation valve according to claim 14, including a protective sleeve adjoining the bearing bushing closer to the duct, wherein the protective sleeve extends from said bearing bushing in the direction of the closing body and surrounds the valve stem at a distance.

16. The hot gas exhaust recirculation valve according to claim 15, wherein a ratio of an effective bearing length, which is defined as a distance between outer edges of the two bearing bushings, and a distance of a radial force exerted by the drive device from the bearing bushing further away from the duct is between 1.2:1 and 1.8:1.

17. The hot gas exhaust recirculation valve according to claim 12, wherein the valve stem and the closing body move together in the longitudinal direction during valve-operation.

18. The hot gas exhaust recirculation valve according to claim 12, wherein the two bearing bushings are configured to arrange the valve stem allowing the valve stem to only be displaced in the longitudinal direction during valve-operation.

* * * * *